United States Patent [19]

Demou et al.

[11] 4,284,728

[45] Aug. 18, 1981

[54] HR FOAMS MADE WITH REACTIVE POLYOL COMPOSITIONS HAVING IMPROVED STABILITY

[75] Inventors: John G. Demou, Lincoln Park; Edward R. Pray, Dearborn; Robert L. McBrayer, Lincoln Park, all of Mich.

[73] Assignee: BASF Wyandotte Corporation, Wyandotte, Mich.

[21] Appl. No.: 146,954

[22] Filed: May 5, 1980

[51] Int. Cl.$^3$ ............................................. C08G 18/14
[52] U.S. Cl. ................................. 521/155; 252/182; 521/99; 521/117; 521/128; 521/130; 521/170; 521/172
[58] Field of Search ................. 521/155, 99, 117, 128, 521/130, 155, 170, 172; 252/182

[56] References Cited

U.S. PATENT DOCUMENTS

| | | | |
|---|---|---|---|
| 2,889,291 | 6/1959 | Moore | 521/130 |
| 3,567,664 | 3/1971 | Haring | 521/117 |
| 3,663,465 | 5/1972 | Fogiel | 521/130 |
| 3,798,198 | 3/1974 | Hole | 521/130 |

*Primary Examiner*—Maurice J. Welsh
*Attorney, Agent, or Firm*—Joseph D. Michaels; Arnold S. Weintraub

[57] ABSTRACT

HR or high resiliency polyurethane foams having improved processing stability are prepared from reactive urethane formation promoting active hydrogen-containing compositions which have been pre-treated with carbon dioxide or a weak acid. The pre-treated active hydrogen-containing composition is, then, reacted with an organic polyisocyante to form the foams hereof.

30 Claims, 1 Drawing Figure

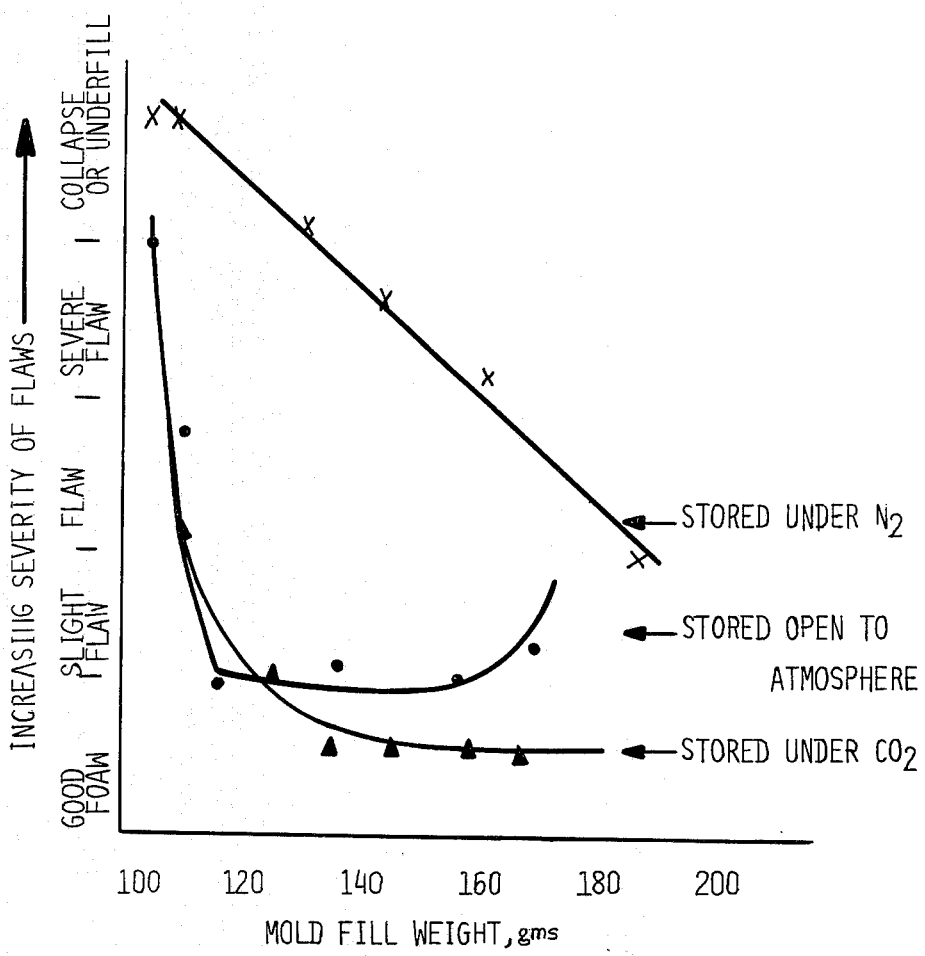

HR FOAMS MADE WITH REACTIVE POLYOL COMPOSITIONS HAVING IMPROVED STABILITY

BACKGROUND OF THE INVENTION

I. Field of the Invention

The present invention concerns HR polyurethane foams. More particularly, the present invention concerns urethane formation promoting active-hydrogen-containing compositions for use in the preparation of HR polyurethane foams. Even more particularly, the present invention concerns stabilized, reactive active-hydrogen-containing compositions for use in HR polyurethane foams.

II. Prior Art

The preparation of HR or high resiliency polyurethane foams with high load bearing and strength properties by the reaction of a polyol or other active-hydrogen-containing compound and an organic polyisocyanate in the presence of a cross-linking agent is well known. Until recently, the most widely used cross-linking agent was 4,4'-methylene-bis-(2-chloroaniline) (MOCA). This compound, which is sterically hindered and negative-substituted, evidences a reactivity rate substantially equal to that of the active hydrogen compound with the isocyanate. Thus, it permitted urethane formation at a good rate, in deference to polyurea formation. However MOCA is a suspected carcinogen and has, thus, been virtually banned. Therefore, the art now seeks viable alternatives to MOCA.

Diamine cross-linking agents which have now been investigated include methylene dianiline, isophorone diamine, and bis-(p-aminocyclohexyl)methane. However, these diamines are highly reactive with isocyanate. Thus, when employed as cross-linking agents with active-hydrogen-containing compounds, they tend to form insoluble polyureas with the isocyanate before urethane formation occurs. Hence, it is readily appreciated that polyurethane foam formation in the presence of highly reactive diamine cross-linking agents can be extremely difficult. In copending U.S. patent application Ser. No. 842,621, filed Oct. 17, 1977 now U.S. Pat. No. 4,176,218 for "HIGH RESILIENCE FLEXIBLE FOAMED POLYURETHANES, FOAMABLE MIXTURES AND PROCESS THEREFOR", the disclosure of which is hereby incorporated by reference, the use of highly reactive cross-linking diamines is disclosed. It has been experienced that polyurethane foam systems incorporating these discoveries are extremely sensitive to external conditions, such as variation in foam formulation, moisture content and the like. Such sensitivity inhibits consistency in foaming. However, because of such difficulty in preparing foams due to the diamine reactivity, the benefits of the diamines cannot be fully achieved.

Therefore, it is to be appreciated that the use of highly reactive diamines would be greatly enhanced if their reactivity could be lessened to equal or approximate that of urethane formation promoting active-hydrogen-containing compound, thereby enabling the preparation of HR polyurethane foams therefrom.

SUMMARY OF THE INVENTION

According to the present invention highly reactive active-hydrogen-containing compositions for use in the preparation of HR polyurethane foams are pre-treated with carbon dioxide or a weak acid prior to their reaction with an organic polyisocyanate. By pre-treating the composition, the reactivity thereof is stabilized thereby enabling consistent production of HR polyurethane foams.

The "compositions" which are carbon dioxide or weak acid pretreated, generally, comprise a blend of (a) a urethane-formation promoting active-hydrogen-containing compound and (b) a reactive cross-linking agent. The pretreated blend is, then, reacted with an organic polyisocyanate to form the HR polyurethane foams hereof.

The carbon dioxide may be introduced directly, as a gas, into the blend. Alternatively, weak acids such as carbonic acid, carbolic acid, oxalic acid, formic acid or the higher homologs thereof can be blended with the polyol composition to stabilize the composition.

For a more complete understanding of the present invention, reference is made to the following detailed description and accompanying examples.

DESCRIPTION OF THE PREFERRED EMBODIMENTS

In accordance with the present invention, high-resiliency, flexible polyurethane foams are prepared by reacting (a) a stabilized active-hydrogen containing composition and (b) an organic polyisocyanate. The stabilized active-hydrogen-containing composition generally comprises a pre-treated blend of (1) a urethane formation promoting active-hydrogen-containing compound and (2) a highly reactive diamine cross-linking agent. The blend is pre-treated, in accordance herewith, with carbon dioxide or a weak acid, which stabilizes the active-hydrogen-containing compound.

Although not wishing to be bound by any theory, it appears that, by pre-treating the active-hydrogen-containing composition, the reactivity of the diamine cross-linking agent is lessened or reduced to equal or approximate that of the active-hydrogen-containing compound. Under such conditions, the reactivity toward the isocyanate between the diamine and the active-hydrogen compound are substantially equal. This enables the production of stable HR polyurethane foams. It is to be, thus, perceived that the present invention stabilizes the process for preparing HR polyurethane foams rendering the foamable mass less susceptible to process variations.

As noted hereinabove, the blend which is pretreated, generally, comprises: (1) a urethane formation-promoting active-hydrogen-containing compound and (2) a reactive diamine cross-linking agent.

The urethane formation-promoting active-hydrogen-containing compound employed herein is that which is determined by the well-known Zerewitinoff test, as described by Kohler in *Journal of the American Chemical Society*, 49, 3181 (1927). These compounds and their methods of preparation are well known in the art.

Suitable active-hydrogen-containing groups, as determined by the Zerewitinoff method, which are reactive with an isocyanate group, include —OH, —NH—, COOH, and SH. Examples of suitable types of organic compounds containing at least two active-hydrogen-containing groups, which are reactive with an isocyanate group, are hydroxyl-terminated polyesters, polyalkylene ether polyols, hydroxyl-terminated polyurethane polymers, polyhydric polythioethers, alkylene oxide adducts of phosphorus-containing acids, polyacetals, aliphatic polyols, aliphatic thiols including alkane, alkene and alkyne thiols having two or more —SH groups. Compounds which contain two or more different groups within the above-defined classes may also be used in accordance with the process of the present invention such as, for example, amino alcohols which contain an amino group and a hydroxyl group. Also, compounds may be used which contain one —SH group and one —OH group as well as those which contain an amino group and a —SH group.

Any suitable hydroxyl-terminated polyester may be used such as are obtained, for example, from polycarboxylic acid, azelaic acid, sebacic acid, brassylic acid, thapsic acid, maleic acid, fumaric acid, glutaconic acid, α- and β-hydromuconic acid, α-butyl-α-ethyl-glutaric acid, α,β-diethylsuccinic acid, isophthalic acid, terephthalic acid, hemimellitic acid, and 1,4-cyclohexanedicarboxylic acid. Any suitable polyhydric alcohol, including both aliphatic and aromatic, may be used such as ethylene glycol, 1,3-propane diol, propylene glycol, 1,4-butane diol, butylene glycol, pentylene glycol, 1,5-pentanediol, 1,4-pentanediol, 1,3-pentanediol, 1,6-hexanediol, 1,7-heptanediol, glycerol, 1,1,1-trimethylolpropane, 1,1,1-trimethylolethane, hexane-1,2,6-triol, α-methyl glucoside, pentaerythritol, and sorbitol. Also included within the term "polyhydric alcohol" are compounds derived from phenol such as 2,2-bis(4-hydroxyphenyl)propane, commonly known as Bisphenol A.

The hydroxyl-terminated polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above.

Any suitable polyalkylene ether polyol may be used such as the polymerization product of an alkylene oxide or of an alkylene oxide with a polyhydric alcohol. Any suitable polyhydric alcohol may be used such as those disclosed above for use in the preparation of the hydroxyl-terminated polyesters. Any suitable alkylene oxide may be used such as ethylene oxide, propylene oxide, butylene oxide, amylene oxide, and mixtures of these oxides. The polyalkylene polyether polyols may be prepared from other starting materials such as tetrahydrofuran and alkylene oxide-tetrahydrofuran copolymers; epihalohydrins such as epichlorohydrin; as well as aralkylene oxides such styrene oxide. The polyalkylene polyether polyols may have either primary or secondary hydroxyl groups and, preferably, are polyethers prepared from alkylene oxides having from two to six carbon atoms such as polyethylene ether glycols, polypropylene ether glycols, and polybutylene ether glycols. The polyalkylene polyether polyols may be prepared by any known process such as, for example, the process disclosed by Wurtz in 1859 and *Encyclopedia of Chemical Technology,* Vol. 7, pp. 257–262, published by Interscience Publishers, Inc. (1951) or in U.S. Pat. No. 1,922,459. Alkylene oxide adducts of Mannich condensation products are also useful in the invention.

Alkylene oxide adducts of acids of phosphorus which may be used include neutral adducts prepared from the alkylene oxides disclosed above for use in the preparation of polyalkylene polyether polyols. Acids of phosphorus which may be used are acids having a $P_2O_5$ equivalency of from about 72% to about 95%. The phosphoric acids are preferred. Also, a polyhydroxyl phosphorous such as those describe in U.S. Pat. No. 3,639,542 may be used herein.

Suitable polyhydric polythioesters which can be condensed with alkylene oxides include the condensation product of thiodiglycol or the reaction product of a dihydric alcohol, such as is disclosed above, for the preparation of the hydroxyl-containing polyesters with any other suitable thioether glycol.

Polyhydroxyl-containing polyacetals can be used. These can be prepared by condensing aldehydes with alkylene oxides and also include the reaction product of formaldehyde or other suitable aldehyde with a dihydric alcohol as well as an alkylene oxide such as those disclosed above.

Suitable aliphatic polyols have been described above. Suitable aliphatic thiols which can be condensed with alkylene oxides include alkane thiols containing at least two —SH groups such as 1,2-ethanedithiol, 1,2-propanedithiol, 1,3-propanedithiol, and 1,6-hexanedithiol; alkene thiols, such as 2-butene-1,4-dithiol, and alkyne thiols such as 3-hexyne-1,6-dithiol.

Suitable amines which can be condensed with alkylene oxides include aromatic amines such as aniline, o-chloroaniline, p-amino aniline, 1,5-diamino naphthalene, methylene dianiline, the condensation products of aniline and formaldehyde, and 2,4-diamino toluene and aliphatic amines such as methylamine, triisopropanolamine, ethylene diamine, 1,3-propylene diamine, 1,4-butylene diamine, and 1,3-butylene diamine.

In addition to the above hydroxyl-containing compounds, other compounds which may be employed include graft polyols. These polyols are prepared by the in situ polymerization of a vinyl monomer in a reactive polyol medium and in the presence of a free radical initiator.

The reactive polyol medium generally has a molecular weight of at least about 500 and a hydroxyl number ranging from about 30 to about 600. The graft polyol has a molecular weight of at least about 1500 and a viscosity of less than 40,000 cps. at 10% polymer concentration.

A more comprehensive discussion of the graft polyols and their method of preparation can be found in U.S. Pat. Nos. 3,383,351; 3,304,273; 3,652,639 and in U.S. Pat. No. 3,823,201, the disclosures of which are hereby incorporated by reference.

Also, polyols containing ester groups can be employed in the subject invention. These polyols are prepared by the reaction of an alkylene oxide with an organic dicarboxylic acid anhydride and a compound containing a reactive hydrogen atom. A more comprehensive discussion of these polyols and their method of preparation can be found in U.S. Pat. Nos. 3,585,185; 3,639,541 and 3,639,542.

Suitable reactive amine cross-linking agents are the tertiary amines described in the aforementioned co-pending patent application and include, for example, methylene dianiline, isophorone diamine, bis(p-aminocyclohexyl)methane, and the like as well as mixtures thereof.

The organic polyisocyanates which are used to prepare the foams hereof, generally, correspond to the formula:

$$R''(NCO)_z$$

wherein R'' is a polyvalent organic radical which is either aliphatic, aralkyl, alkaryl, aromatic or mixtures thereof, and z is an integer which corresponds to the valence of R'' and is at least two. Representative of the organic polyisocyanates contemplated herein includes, for example, the aromatic diisocyanates, such as 2,4-toluene diisocyanate, 2,6-toluene diisocyanate, mixtures of 2,4- and 2,6-toluene diisocyanate, crude toluene diisocyanate, methylene diphenyl diisocyanate, crude methylene diphenyl diisocyanate and the like; the aromatic triisocyanates such as 4,4',4"-triphenylmethane triisocyanate, 2,4,6-toluene triisocyanates; the aromatic tetraisocyanates, such as 4,4'-dimethyldiphenylmethane-2,2',5,5'-tetraisocyanate, and the like; aralkyl polyisocyanates, such as xylylene diisocyanate; aliphatic polyisocyanates, such as hexamethylene-1,6-diisocyanate, lysine diisocyanate methylester and the like, and mixtures thereof. Other organic polyisocyanates include polymethylene polyphenylisocyanate, hydrogenated methylene diphenylisocyanate, m-phenylene diisocyanate, naphthylene-1,5-diisocyanate, 1-methoxyphenyl-2,4-diisocyanate, 4,4'-biphenylene diisocyanate, 3,3'-dimethoxy-4,4'-biphenyl diisocyanate, 3,3'-dimethyl-4,4'-biphenyl diisocyanate and 3,3'-dimethyldiphenylmethane-4,4'-diisocyanate.

These polyisocyanates are prepared by conventional methods known in the art such as the phosgenation of the corresponding organic amine.

Still another class of organic polyisocyanates contemplated for use herein are the so-called "quasi-prepolymers". These quasi-prepolymers are prepared by reacting an excess of organic polyisocyanate or mixtures thereof with a minor amount of an active-hydrogen-containing compound such as those described hereinabove.

In practicing the present invention, the preferred active-hydrogen-containing compound which is blended with the cross-linking agent is a polyhydroxyl-containing compound (polyol) or mixtures thereof and the preferred polyisocyanate is toluene diisocyanate, methylene diphenyldiisocyanate, crude methylene diphenyldiisocyanate or mixtures thereof.

The blend of active-hydrogen-containing compound and cross-linking agent, as noted, is pre-treated with either carbon dioxide or an acid, and preferably a weak acid. Representative of the weak acids which may be used herein include, for example, carbonic acid, carbolic acid, oxalic acid, formic acid and the higher homologs of oxalic and formic acid. The acids may be substituted or unsubstituted. Where substituted, the substituents are those which are nonreactive with the active-hydrogen-containing compound, the cross-linking agent or the isocyanate.

The carbon dioxide is employed by bubbling it into the blend. Generally, from about 0.05 to 2.0 moles, and preferably from about 0.5 to about 1.5 moles of carbon dioxide per equivalent of cross-linking agent is employed.

The weak acid is employed in an amount sufficient to hinder the reactivity of the diamine. Ordinarily, the molar or equivalent quantities of acid are the same as those of carbon dioxide.

The acid is admixed with the blend by any conventional technique.

In the preparation of high resiliency foams, and as is known to those skilled in the art to which the present invention pertains, additional substituents are ordinarily incorporated into the foam formulation.

Such additional ingredient or substituents include urethane catalyst, blowing agents, surfactants and the like.

Useful catalysts include the metal or organometallic salts of carboxylic acid and tertiary amines. Representative of such compounds are: dibutyltin dilaurate, dibutyltin diacetate, stannous octoate, lead octoate, cobalt naphthenate, and other metal or organometallic salts of carboxylic acids in which the metal is bismuth, titanium, iron, antimony, uranium, cadmium, aluminum, mercury, zinc, or nickel as well as other organometallic compounds such as are disclosed in U.S. Pat. No. 2,846,408. Tertiary amines such as triethylene diamine, triethylamine, methylmorpholine, trimethylpiperazine, N-ethylmorpholine and diethyl ethanolamine may also be employed as well as mixtures of any of the above. Preferred urethane-promoting catalysts are the tin salts of carboxylic acids, such as dibutyltin dilaurate and dibutyltin diacetate. Generally, the amount of the urethane-promoting catalyst employed will be from 0.01 part to 10 parts per 100 part of organic polyisocyanate.

A typical blowing agent is water.

Surfactants contemplated for use herein include the silicone surfactants, such as alkylpolysiloxane and polyalkylsiloxanes.

Where the additional substituents are employed, they are, typically, admixed with the stabilized blend prior to the reaction of the polyisocyanate therewith.

The HR polyurethane foams are prepared by mixing together, at ambient conditions, the polyisocyanate and the stabilized blend, in accordance with conventional techniques. The foams hereof are stable, high load bearing and high strength products.

Following are specific illustrated examples of the present invention. In the examples all parts are by weight absent indications to the contrary.

In each example, the following ingredients and amounts were utilized for the various compositions:

Polyol—a blend of (1) 68.5 parts of ethoxylated and propoxylated trimethylolpropane having an OH No. of 35; (2) 30.0 parts of an acrylonitrile-styrene-grafted triol polyol having an OH No. of 28 and, (3) 1.5 parts of bis(p-aminocyclohexyl)methane.

Catalyst 1—bis(2-dimethyl-aminoethyl)ether blended with dipropylene glycol.

Catalyst 2—an amine catalyst sold by Jefferson Chemical under the name THANCAT DM-70.

Catalyst 3—33% triethylene diamine catalyst in dipropylene glycol.

Catalyst 4—dibutyltin dilaurate.

Surfactant—a 10:1 weight ratio blend of a silicone surfactant and a dimethylsilicone fluid.

Isocyanate—a 9:1 weight mixture of (1) 80:20 2,4- and 2,6-toluene diisocyanate and (2) crude methylene diphenyldiisocyanate.

EXAMPLE I

Into a suitable reaction vessel equipped with high speed agitation means and at room temperature was charged a polyol blend and a reactive diamine cross-linking agent. Dry ice was placed in proximity to the vessel and exposed to ambient temperature to permit carbon dioxide gas to issue therefrom. The dry ice was encased within a jar and a hose was led from the jar to the reaction vessel. The carbon dioxide gas from the dry ice was bubbled through the vessel for five to ten minutes while the mixture was agitated. After carbon dioxide gas addition was stopped, a catalyst blend, a surfactant and water, as a blowing agent, was added to the now stabilized blend. The mixture was agitated for 30 seconds at 3500 rpm. Stirring was, then, stopped for 15 seconds to permit entrapped air to escape. Stirring was, then, restarted. After fifteen seconds of high-speed stirring, the isocyanate was added to the vessel. Stirring was continued for about five seconds. Next, about 170 parts of the foam formulation were transferred to a paper container in which foam formation occurred.

This procedure was repeated, but without the introduction of carbon dioxide into the blend. However, no stable foam formation occurred.

The following table sets forth the ingredients, the amounts of the ingredients and the observed physical properties of the foams.

TABLE I

|  | FOAM[a] 1 | FOAM[b] 2 |
|---|---|---|
| A. Ingredient, amount pbw |  |  |
| Polyol | 100. | 100. |
| Distilled Water | 2.55 | 2.55 |
| Catalyst 1 | 0.13 | 0.13 |
| Catalyst 2 | 0.27 | 0.27 |
| Catalyst 3 | 0.27 | 0.27 |
| Catalyst 4 | 0.01 | 0.01 |
| Surfactant | 0.55 | 0.55 |
| Isocyanate | 33.3 | 33.3 |
| Isocyanate Index | 103. | 103. |
| B. Observed Properties |  |  |
| Rise Time, top of cup, sec | 28. | 28. |
| Rise Time, gas-off, sec | — | 115. |
| Collapse Time of foam, sec | 105. | — |
| Foam Weight, gms | 172. | 171. |
| Foam Weight, mm | 97. | 181. |

[a]non-$CO_2$ treated
[b]$CO_2$ treated

EXAMPLE II

This example illustrates the improved processing of mold foam afforded by the present invention.

Following substantially the same procedure of Example I, a series of hand-mixed mold foams were prepared and, then, tested for physical properties. In preparing each foam, a polyol blend, which was stored under a prescribed atmosphere, was employed. Each polyol blend was "aged" or stored 193 days in its preselected atmosphere. The type of storage atmosphere employed and the resulting physical properties of the foams are set forth in Table II.

Each foam sample was prepared from the same foam formulation employed in Example I. It should be noted, also, that a mold release agent was incorporated into the polyol blend.

TABLE II

| Properties | Foam Sample | | | | | |
|---|---|---|---|---|---|---|
|  | A | B | C | D | E | F |
| Atmosphere | air | dry air | $CO_2$ | Open | Nitrogen | Control |
| Mold Temp, °F. | 135 | 135 | 135 | 135 | 135 | 135 |
| Cure Temp, °F. | 200 | 200 | 200 | 200 | 200 | 200 |
| Cure time, min | 5 | 5 | 5 | 5 | 5 | 5 |
| Demold Temp, °F. | 149 | 150 | 150 | 149 | 151 | 150 |
| Foam weight | 163 | 160 | 172 | 170 | 161 | 150 |
| Foam appearance | good | fairly good | very good | good | surface collapse | some surface collapse |
| No. top corner voids | 3 | 4 | 0 | 0 | 3 | 4 |
| No. top corner hard | 4 | 4 | 1, slight | 4 | 3 | 3 |
| Surface Shear | none | slight | none | slight | some | some |

The data shows that foams having the least flaws are those prepared from reactive polyol compositions stored in a carbon dioxide atmosphere.

The data, also, shows that the carbon dioxide treated polyol blends with a reactive diamine had the thickest skin; the sample open to the atmosphere had the next thickest skin; the samples sealed in "ordinary" air and "dry" air had a small amount of skin, whereas the sample prepared from the polyol sealed in nitrogen had no skin. This shows a reaction occurring between the diamine cross-linking agent and the carbon dioxide.

Also, it should be noted, that stable, free-rise, hand-mixed foams are available only with those blends pretreated with carbon dioxide or left open to the atmosphere which, in essence, provides surface carbon dioxide treatment. Foams prepared without a carbon dioxide source collapse.

EXAMPLE III

To further test the efficacy of the present invention, a series of mold fill weight tests were carried out on various foam samples, the polyol blends of which were pretreated in various atmospheres.

The foams were prepared using the procedure and formulation of Example I. The following table, Table III, sets forth a sampling of the various samples, including the type of atmosphere in which the polyol was pre-treated and the resulting physical properties of the foam.

For each sampling, the mold temperature was 135° F.; a mold-release agent was employed; the cure temperature was 200° F., and the cure time was five minutes.

TABLE III

Effect of Mold Fill Weight on Foam

A. BLEND OPEN TO ATMOSPHERE

| Property | FOAM SAMPLE | | | |
|---|---|---|---|---|
|  | A | B | C | D |
| Demold Temp, °F. | 149 | 150 | 150 | 151 |
| Foam Wt, | 170 | 167 | 154 | 110 |
| Gen'l Appearance | good | good | good | bad |
| No. of top corners void | 0 | 0 | 2, slight | 1 |
| No. of top corners hard |  | 4, slight |  | 1 |
| Bottom surface flow |  |  | Slight |  |
| Top Surface Shear |  |  | Some |  |
| Under top surface collapse |  |  |  |  |
| Bottom Surface Shear |  |  |  |  |

B. BLEND STORED IN $CO_2$

| Property | FOAM SAMPLE | | | |
|---|---|---|---|---|
|  | E | F | G | H |
| Demold Temp, °F. | 151 | 150 | 148 | 149 |
| Foam Wt, | 166 | 157 | 146 | 112 |
| Gen'l Appearance | good | good | good | good |
| No. of top corners void | 0 | 0 | 0 | fill |

TABLE III-continued

Effect of Mold Fill Weight on Foam

| | | | | |
|---|---|---|---|---|
| No. of top corners hard | 0 | 0 | 0 | 0 |
| Bottom surface flow | | None | | |
| Top Surface Shear | | None | | |
| Under top surface collapse | | | | |
| Bottom surface Shear | | | | |

C. BLEND STORED UNDER $N_2$

| | FOAM SAMPLE | | |
|---|---|---|---|
| Property | I | J | K |
| Demold Temp. F. | 151 | 149 | 150 |
| Foam Wt. | 161 | 107 | 105 |
| Gen'l Appearance | fair | very bad | |
| No. of top corners void | very bad | collapse in center | |
| No. of top corners hard | 3 | | |
| Bottom surface flow | | Slight | |
| Top Surface Shear | | | |
| Under top surface collapse | | | |
| Bottom Surface Shear | Moderate | None | |

The table shows the reduced sensitivity of $CO_2$ treated polyol blends to fill weights. This is more dramatically shown in FIG. 1.

EXAMPLE IV

A series of machine-made foams were prepared on an Admiral machine in accordance with the present invention.

In accordance herewith, carbon dioxide gas was sparged through a blend of a polyol and an active amine cross-linking agent for about thirty minutes. Then, water, catalyst and surfactant were added to the blend to form the master batch which, in turn, was reacted with an isocyanate.

It was noted that pre-treatment raised the viscosity of the blend from 1800 cps to 3100 cps.

The master batch was, then, allowed to age for twenty-four hours in the machine and, thereafter, a foam was prepared therefrom and evaluated for physical properties.

Next, a non-$CO_2$ treated resin master batch of the same formulation was prepared and a foam was produced therefrom. The unused master batch was permitted to age in the machine for twenty-four hours and foam products were, then, prepared therefrom and evaluated for physical properties.

The following table, Table IV, shows the foam formulation and the physical properties of the resulting product.

TABLE IV

| Formulation, amt, pbw | Sample[1] A | Sample[2] B | Sample[3] C | Sample[4] C |
|---|---|---|---|---|
| Polyol | 100 | 100 | 100 | 100 |
| Distilled water | 2.55 | 2.55 | 2.55 | 2.55 |
| Catalyst 1 | 0.21 | 0.21 | 0.21 | 0.21 |
| Catalyst 2 | 0.08 | 0.08 | 0.08 | 0.08 |
| Catalyst 3 | 0.33 | 0.33 | 0.33 | 0.33 |
| Catalyst 4 | 0.01 | 0.01 | 0.01 | 0.01 |
| Surfactant | 0.55 | 0.55 | 0.55 | 0.55 |
| Isocyanate | 34.3 | 34.3 | 34.3 | 34.3 |
| Physical Properties | | | | |
| Density, pcf | 2.43 | 2.32 | 2.39 | 2.35 |
| Tensile strength, psi | 23.6 | 23.9 | 21.8 | 22.5 |
| Elongation, % | 184 | 176 | 159 | 157 |
| Tear, psi. (2"/min.) | 2.45 | 2.34 | 2.39 | 2.26 |
| ILD, lb/50 sq. in. | | | | |
| sample thickness, in. | 2.62 | 2.62 | 2.63 | 2.58 |
| 25% | 26.6 | 27.6 | 25.7 | 24.5 |
| 65% | 64.4 | 69.6 | 68.6 | 68.0 |
| 25% return | 21.1 | 21.6 | 19.4 | 19.2 |
| Sag factor | 2.42 | 2.52 | 2.67 | 2.78 |
| Recovery, % | 79.3 | 78.4 | 75.4 | 78.6 |
| Compression set, % | | | | |
| 50% | 12.1 | 11.1 | 11.4 | 10.4 |
| 75% | 9.2 | 8.7 | 10.9 | 8.3 |
| | Sample A | Sample B | Sample C | Sample D |
| Humid Age 5 hrs. at 250° F. CLD, % of original 50% | 70.3 | 70.6 | 74.9 | 78.4 |
| Compression set, % | | | | |
| 50% | 26.4 | 25.7 | 37.8 | 32.2 |
| 75% | 46.0 | 36.8 | 68.5 | 58.9 |
| Heat Aged 22 hrs. at 284° F. | | | | |
| tensile strength, psi | 22.7 | 22.6 | 21.1 | 20.7 |
| % of original | 96.2 | 94.6 | 96.8 | 92.0 |
| MVSS 302 Flame Test | | | | |
| No. not to benchmark | 3 | 3 | 3 | 3 |
| Avg. distance burned | 0.85 | 0.83 | 1.00 | 0.98 |
| Burning time, sec. | 18.4 | 17.1 | 20.6 | 20.5 |

[1] treated with $CO_2$
[2] treated with $CO_2$, aged 24 hrs.
[3] not treated with $CO_2$
[4] not treated with $CO_2$, aged 24 hrs.

It should be noted that parts prepared from the carbon dioxide treated polyol blend were superior to similar parts prepared from untreated polyol blend with respect to surface appearance and the like.

The embodiments of the invention in which an exclusive privilege or property are claimed are defined as follows:

1. A reactive mixture for the preparation of a high resiliency polyurethane foam, comprising:
   (a) an active-hydrogen containing compound;
   (b) a cross-linking agent containing reactive amine; and
   (c) an amine reactive stabilizer selected from the group consisting of carbon dioxide and an acid which is reactive with the cross-linking agent such that it reduces the activity thereof to be substantially equal to that of the active-hydrogen containing compound.

2. The mixture of claim 1 wherein the amine cross-linking agent is a diamine.

3. The mixture of claim 2 wherein the cross-linking agent is selected from the group consisting of methylene dianiline, isophorone diamine, bis(p-aminocyclohexyl)methane and mixtures thereof.

4. The mixture of claim 3 wherein the cross-linking agent is bis(p-aminocyclohexyl)methane.

5. The mixture of claim 1 wherein the active-hydrogen containing compound is a polyol.

6. The mixture of claim 1 wherein the stabilizer is present in an amount ranging from about 2.5 to 0.1 moles thereof per mole of cross-linking agent.

7. The mixture of claim 1 wherein the stabilizer is selected from the group consisting of carbonic acid, carbolic acid, oxalic acid, formic acid, the homologs of oxalic acid, the homologs of formic acid and mixtures thereof.

8. A method for stabilizing a reactive mixture of an active-hydrogen containing compound and a cross-linking agent used for the preparation of high resiliency polyurethane foams, comprising: introducing into the mixture a stabilizer which is either carbon dioxide or a weak acid.

9. The method of claim 8 wherein the cross-linking agent is a diamine.

10. The method of claim 9 wherein the cross-linking agent is selected from the group consisting of methylene dianiline, isophorone diamine, bis(p-aminocyclohexyl)methane and mixtures thereof.

11. The method of claim 10 wherein the cross-linking agent is bis(p-aminocyclohexyl)methane.

12. The method of claim 11 wherein the active-hydrogen-containing compound is a polyol.

13. The method of claim 12 wherein the stabilizer is present in an amount ranging from about 0.1 to 3.5 moles thereof per mole of cross-linking agent.

14. The method of claim 13 wherein the stabilizer is selected from the group consisting of carbonic acid, carbolic acid, oxalic acid, formic acid, the homologs of oxalic acid, the homologs of formic acid and mixtures thereof.

15. A high resiliency polyurethane foam comprising the reaction product of an organic polyisocyanate and the reaction mixture of claim 1.

16. The polyurethane of claim 15 wherein the organic polyisocyanate corresponds to the formula:

wherein R is a polyvalent organic radical which is either aliphatic, aromatic, arylalkyl, arylalkyl or mixtures thereof and z is an integer corresponding to the valence of R and is at least 2.

17. The polyurethane of claim 15 wherein the amine cross-linking agent is a diamine.

18. The polyurethane of claim 17 wherein the cross-linking agent is selected from the group consisting of methylene dianiline, isophorone diamine, bis(p-aminocyclohexyl)methane and mixtures thereof.

19. The polyurethane of claim 18 wherein the cross-linking agent is bis(p-aminocyclohexyl)methane.

20. The polyurethane of claim 19 wherein the active-hydrogen-containing compound is a polyol.

21. The polyurethane of claim 20 wherein the stabilizer is present in an amount ranging from about 0.05 to about 2.0 moles thereof per equivalent of cross-linking agent.

22. The polyurethane of claim 21 wherein said acid is selected from the group consisting of carbonic acid, carbolic acid, oxalic acid, formic acid, the homologs of oxalic acid, the homologs of formic acid and mixtures thereof.

23. A method for preparing a stabilizer, high resiliency polyurethane foam, comprising reacting an organic polyisocyanate and the reaction mixture of claim 1.

24. The method of claim 23 wherein the organic polyisocyanate corresponds to the formula:

wherein R is a polyvalent organic radical which is either aliphatic, aromatic, akalkyl, alkaryl or mixtures thereof and z is an integer corresponding to the valence of R and is at least 2.

25. The method of claim 24 wherein the amine cross-linking agent is a diamine.

26. The method of claim 25 wherein the cross-linking agent is selected from the group consisting of methylene dianiline, isophorone diamine, bis(p-aminocyclohexyl)methane and mixtures thereof.

27. The method of claim 26 wherein the cross-linking agent is bis(p-aminocyclohexyl)methane.

28. The method claim 27 wherein the active-hydrogen-containing compound is a polyol.

29. The method of claim 28 wherein the stabilizer is present in an amount ranging from about 0.5 to about 2.0 moles thereof per equivalent of cross-linking agent.

30. The method of claim 29 wherein said acid is selected from the group consisting of carbonic acid, carbolic acid, oxalic acid, formic acid, the homologs of oxalic acid, the homologs of formic acid and mixtures thereof.

* * * * *

UNITED STATES PATENT AND TRADEMARK OFFICE
CERTIFICATE OF CORRECTION

PATENT NO. : 4,284,728
DATED : August 18, 1981
INVENTOR(S) : John G. Demou, Edward R. Pray and Robert L. McBrayer It is certified that error appears in the above-identified patent and that said Letters Patent are hereby corrected as shown below:

Column 11, claim 16, line 36, second occurrence, "arylalkyl" should read "alkaryl".

Column 12, claim 24, line 24, "akalkyl" should read "arylalkyl".

Signed and Sealed this

Tenth Day of November 1981

[SEAL]

Attest:

GERALD J. MOSSINGHOFF

Attesting Officer        Commissioner of Patents and Trademarks